Figure 1:
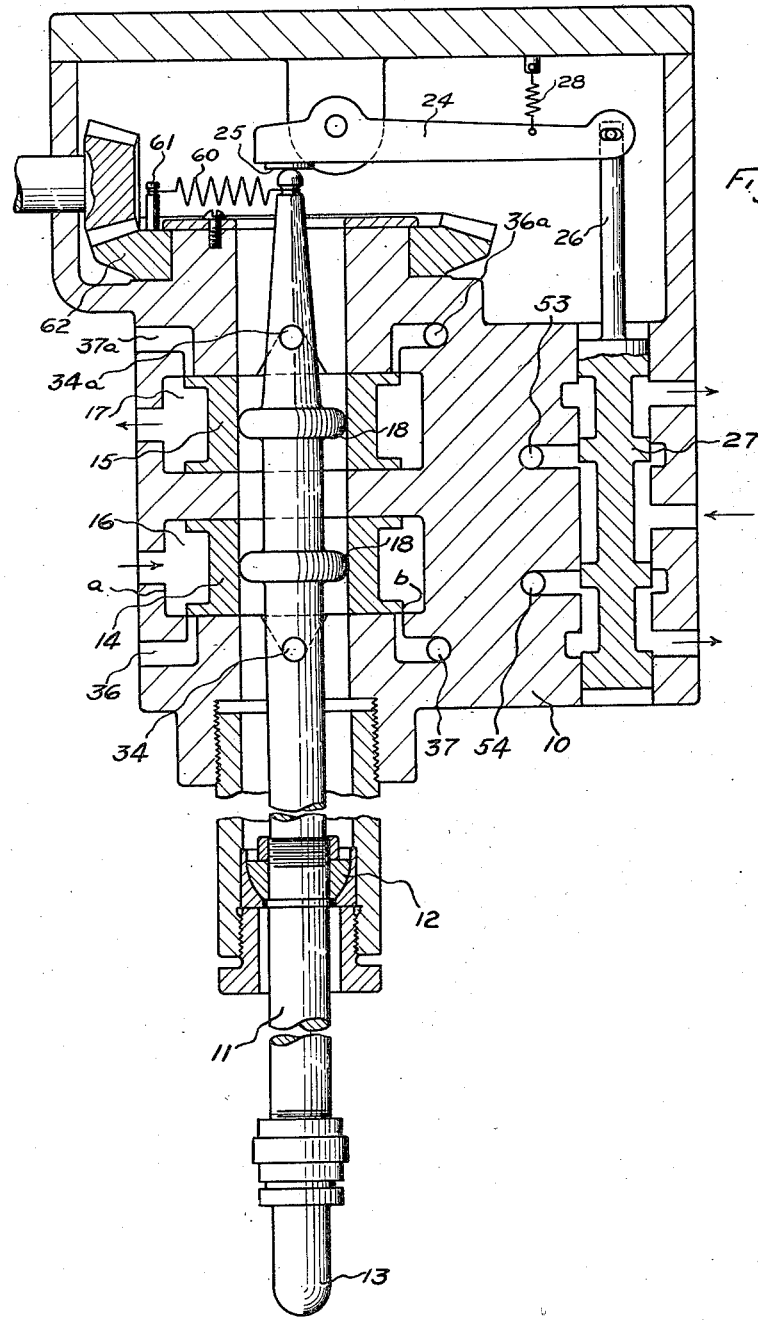

Patented May 11, 1937

2,079,720

UNITED STATES PATENT OFFICE 2,079,720

TRACER FOR HYDRAULICALLY OPERATED DIE SINKING MACHINES

Robert D. Shaw, Hartford, Conn., assignor, by mesne assignments, to Niles-Bement-Pond Company, New York, N. Y., a corporation of New Jersey Application January 28, 1936, Serial No. 61,211

9 Claims. (Cl. 90—62)

This invention relates to pattern following tracers for controlling the operation of hydraulically operated machine tools such as die sinking machines.

An object of the present invention is to provide controlling valves for opening and closing conduits in the hydraulic system of the machine which in turn control movements of the principal parts thereof, the valves being opened and closed by oscillatory or axial movements of the pattern following tracer member.

One feature which enables me to accomplish the above object is that the tracer is in the form of a universally movable tracer bar having limited oscillatory and axial movements, the oscillatory movements of the bar about an intermediate ball and socket joint serving to open and close conduits to move the work and tool laterally relative to each other in directions normal to each other, and the axial movements of the bar serving to open or close other conduits controlling the toward and from relationship between the work and cutter.

Another feature which is of importance is that axial movements of the tracer bar to vary the toward and from relationship between the cutter and work can take place with the tracer bar in any oscillated position and oscillatory movements of the bar to control the lateral movements of the work relative to the cutter can take place with the tracer bar in any axial position.

With the above and other objects in view, my invention includes the features of construction and operation set forth in the following specification and illustrated in the accompanying drawings.

In the accompanying drawings annexed hereto and forming a part of this specification, I have shown my invention embodied in a die sinking machine of the type shown and described in my copending application Serial No. 454,646 filed May 22, 1930 but it will be understood that the invention can be otherwise embodied and that the drawings are not to be construed as defining or limiting the scope of the invention, the claims appended to this specification being relied upon for that purpose.

Figure 2:
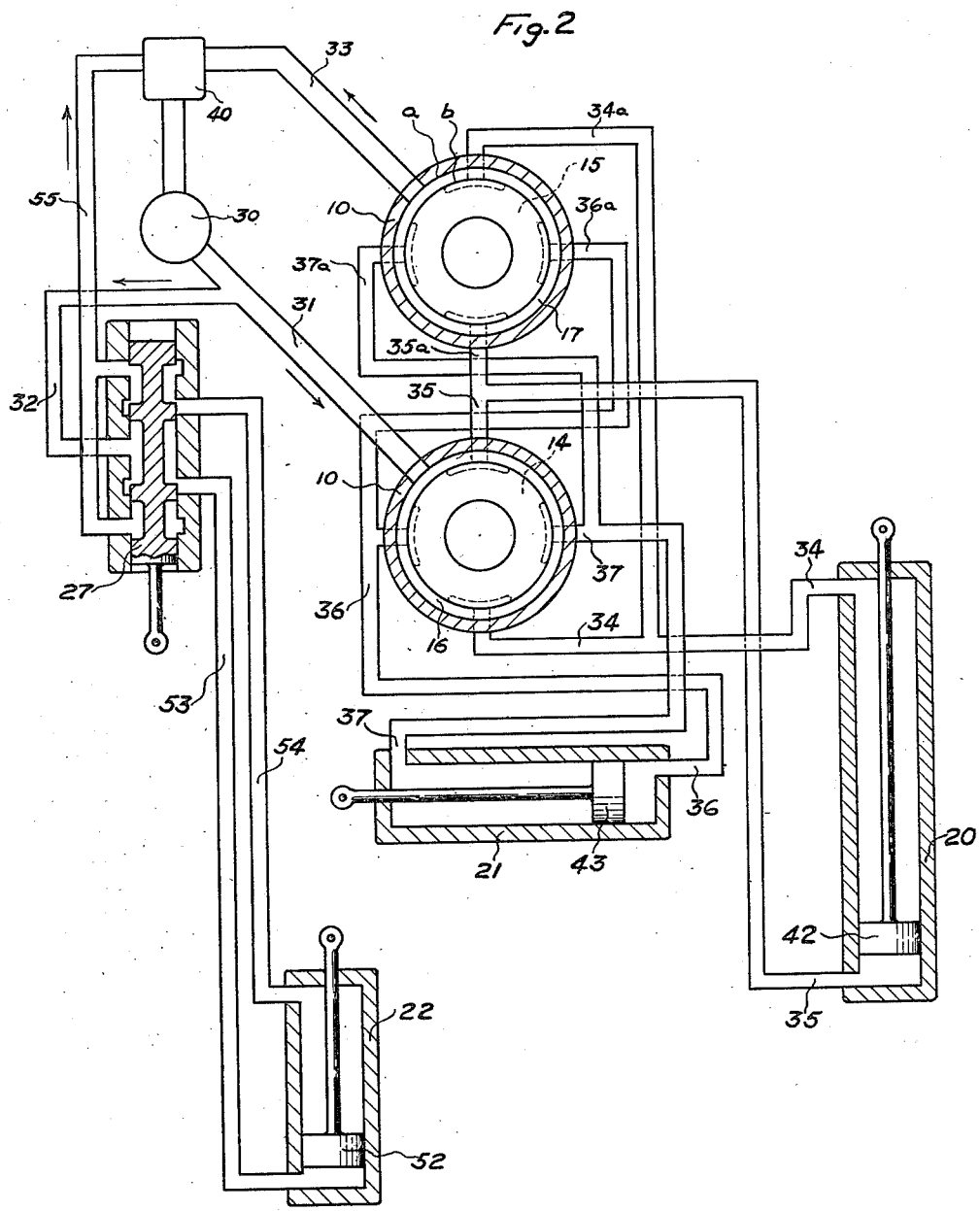

In the drawings:

Figure 1 is a longitudinal sectional view of the pattern following tracer and the fluid controlling valves movable thereby; and Fig. 2 is a diagrammatic view of the hydraulic system and the tracer controlled valves employed with my improved hydraulic tracer.

In the above mentioned drawings I have shown but one embodiment of the invention which is now deemed preferable, but it is to be understood that changes and modifications may be made within the scope of the appended claims without departing from the spirit of the invention.

Briefly and in its preferred aspect, my invention may include the following principal parts: First, a tracer body member having a tracer bar extending longitudinally therethrough and supported upon a ball and socket joint intermediate its ends so that it may oscillate through a limited angle in any direction and may also move axially a limited distance; second, valves movable laterally by oscillatory movements of the tracer bar, there being preferably two of these valves simultaneously movable in the same direction by an oscillatory movement of the tracer bar; third, a lever, one end of which engages the end of the tracer bar opposite that engaged by the pattern; and fourth, a valve movable by pivotal movements of this lever when the tracer bar is moved axially in any of its oscillated positions.

In the above mentioned copending application there is shown a die sinking machine the movable members of which are operated by means of hydraulic pistons movable in cylinders disposed normally to each other. The present invention is adapted for application to a similar hydraulically operated machine but, instead of having a standard electrical controlling tracer as shown in the copending application, the present tracer mechanism and machine are wholly hydraulic in their control and operation. For simplicity of illustration and description, relay valves are not shown between the conduits opened and closed by the movements of the tracer bar and the conduits supplying fluid to the cylinders for actuating the pistons. Such relay valves and circuits, however, may be introduced in the usual manner. Fig. 2 shows the three pistons in the same plane for better illustration of the operation of the machine. It will be understood that the cylinder controlling toward and from relationship between the pattern and tracer will be normal to the plane in which the axes of the other cylinders lie. This diagram also shows valve chambers 16 and 17 spaced laterally for clearer description and illustration. The present form of the invention shows all fluid for actuating the pistons of the hydraulic cylinders and the movable members of the die sinking machine passing through the tracer controlled conduits, passages through which are opened and closed by movements of the valves actuated by oscillatory and axial movements of the tracer bar.

Referring more in detail to the figures of the drawings, I provide a casing or body member 10 for a tracer bar 11 which may be mounted in position upon the die sinking machine similarly to the electrically operated tracer bar shown in the above referred to copending application. The bar 11 passes longitudinally through this casing 10 and is mounted for universal limited movement in a suitable ball and socket bearing 12 provided within the casing. As the form of bearing is similar to that shown and described in patent to Shaw et al. 2,007,899 granted July 9, 1935, further description is not thought to be necessary. The disposition of the bearing 12 is such that limited axial movement of the tracer bar 11 may take place rearwardly from the position shown in Fig. 1 as well as limited oscillatory movements in any direction. The pattern engaging end of the tracer bar 11 is provided in the usual manner with a removable tracer following member 13 having a spherical end surface of any desired diameters.

Intermediate the tracer bar, between its bearing 12 and rearward end, are interposed two laterally slidable valves 14 and 15, one above the other, but spaced apart by a portion of the casing 10 so that separate valve chambers 16 and 17 for the valves 14 and 15 are provided. These two valves 14 and 15 are preferably in the form of spools or sleeves having flat parallel end faces and having cylindrical internal surfaces engaging curved annular surfaces 18 upon the tracer bar 11 so that oscillatory movements of the tracer bar 11 will move the valves laterally in any direction. Intercepting the valve chambers 16 and 17 within which these valves 14 and 15 operate are conduits presently to be more fully described supplying fluid to two of the three cylinders 20, 21 and 22 shown diagrammatically in Fig. 2. The operation of this hydraulic system by opening and closing different conduits to the separate cylinders 20, 21 and 22 will presently be described.

Directly in rear of the tracer bar 11 is a pivotally mounted lever 24, one arm of which is provided with a plane surface 25 disposed normally to the axis of the tracer bar 11 when in its central position and in contact therewith. The opposite end of the lever 24 is attached by a suitable connecting rod or link 26 to an elongated piston or spool valve 27 movable axially to different positions to open and close conduits of the hydraulic system admitting and exhausting fluid to and from the third cylinder 22 of the hydraulic system. The lever 24, may, as shown, be supported upon a portion of the casing 10 by a suitable transversely mounted pivot. A light spring 28 between the lever 24 and the casing 10 presses the short end of the lever 24 against the tracer bar 11 and holds this bar 11 lightly toward its socket 12.

Referring to the hydraulic diagram, Fig. 2 of the drawings, it will be seen that pump 30 furnishes fluid under pressure to the chamber 16 of the laterally movable valve 14 and to the center portion of the valve casing within which the axially movable valve 27 operates. Conduit 31 extends from the pump 30 to the valve chamber 16 and a branch conduit 32 extends from conduit 31 to the chamber for valve 27. An exhaust or return conduit 33 extends from chamber 17 to the sump 40.

From an inspection of Figs. 1 and 2 it will be seen that there are four ports angularly spaced centrally of each of the valve chambers 16 and 17 which are opened and closed by lateral movements of the valves 14 and 15. Depending upon the direction of lateral movement of the valves 14 and 15 one or any two adjacent ports will be opened and the ports opposite the valve or valves opened will be closed. These ports intercepting valve chamber 16 form the ends of conduits 34 and 35 leading to opposite ends of cylinder 20 and of conduits 36 and 37 leading to the ends of cylinder 21. Each of these conduits 34, 35, 36, 37 has a branch conduit 34ª, 35ª, 36ª, 37ª extending from an intermediate part of its conduit to a port opening into valve chamber 17. From valve chamber 17 there is a conduit 38 to a sump or tank 40. Valve chamber 16 may be referred to as the pressure chamber and chamber 17 as the draining or return chamber. When any port in pressure chamber 16 is open permitting fluid to flow to one end of a cylinder 20 or 21 there is a port opening into the draining chamber 17 permitting fluid to flow from the opposite end of that cylinder to the sump.

As an example let it be assumed that the valves 14 and 15 have been moved to the right as seen in Figs. 1 and 2, thus opening ports to conduits 36 and 36ª and closing ports of conduits 37 and 37ª. Fluid under pressure may therefore flow into the right hand end of cylinder 21 through conduit 36 and from the opposite end of the cylinder 21 through conduits 37 and 37ª to chamber 17. From the chamber 17 the fluid will be returned to the sump 40 by conduit 38. Should the tracer bar 11 be moved in an oblique direction with respect to the disposition of the valves 14 and 15 shown in Fig. 2, two adjacent ports would be opened simultaneously in each chamber 16 and 17 and two ports simultaneously closed in each of the chambers. Fluid in that case would be admitted at one end of each of the two cylinders 20 and 21 and exhausted from the opposite ends.

By means of the pistons 42 and 43 movable within cylinders 20 and 21 parts of the machine may be moved in accordance with the configuration of the pattern or model and the movements of the tracer. As the elements of the machine moved by means of pistons 42 and 43 form no part of the present invention and may be similar in every way to those shown in the above referred to application, further description will not be necessary.

Movement axially of the tracer bar 11 opens and closes ports controlled by valve 27 by axial movement thereof in the manner described above. As shown in Fig. 2, the chamber for this valve 27 has ports opening into intermediate portions from conduits 50 and 51 extending to opposite ends of the third hydraulic cylinder 22. Movement of the piston 52 within this cylinder controls the movements of the work and tool toward and away from each other. With the tracer bar 11 in the position shown, fluid is being admitted through conduit 32 to a portion of the valve chamber. From this chamber the fluid can pass one of the heads on valve 27 and enter conduit 53 leading to the bottom of cylinder 22. Correspondingly the other intermediate head on valve 27 opens conduit 54 from the upper end of cylinder 22 and permits fluid to flow into an exhaust conduit 55 intercepting an end portion of the chamber and leading to the sump 40.

From an inspection of Fig. 1 it will be seen that axial movement of the tracer bar 11 and axial movement of the valve can take place with the bar 11 in any oscillated position. Also the movement of the valve 27 is much greater in amount than the axial movement of the bar 11. Movement of the valve 27 is also opposite in direction to the movement of the tracer bar.

Until the bar 11 touches the pattern being copied the valve 27 will remain open as shown to admit fluid to the lower end of cylinder 22 which will move the tool toward the work. When the bar 11 touches the pattern the bar 11 will be forced rearward slightly which closes conduits 53 and 54, thus stopping further movement of the tool toward the work. Should the pattern call for movement of the tool away from the work further movement rearward of the bar 11 would take place which would move the valve 27 to open conduit 54 to the portion of the chamber of valve 27 into which supply conduit 32 extends, thus forcing fluid to the upper end of cylinder 22. Simultaneously conduit 53 would be opened to the conduit 55 permitting fluid to exhaust to the sump 40.

In order to assure movement of the machine elements or one of them laterally during those periods when the tracer bar 11 is not in contact with the pattern, a light spring 60 is employed connecting the rear end of the tracer 11 flexibly to a pin 61 outstanding from a rotatable member 62 supported on the casing 10 coaxially of the tracer. As the operation of this member is similar in every way to the corresponding means shown in the above referred to patent, further description will not be necessary. It will be sufficient to state that the bar 11 is always pressed to an oblique position so that while the tracer 11 is out of engagement from the pattern or model one or more ports in valve chambers 16 and 17 are open to admit fluid to one or both of cylinders 20 and 21.

What I claim is:

1. A combination contouring and profiling tracer for hydraulically operated die sinking machines comprising in combination, a body member, a universally oscillatory and longitudinally movable tracer bar therein, a valve member movable relative to said body member by oscillatory movements of said tracer bar to open and close fluid supply and exhaust conduits of a hydraulic operating system for said die sinking machine, and a valve member movable relative to said body member by longitudinal movements of said bar to open and close other fluid supply and exhaust conduits of said hydraulic system.

2. A combination contouring and profiling tracer for hydraulically operated die sinking machines comprising in combination, a body member, a universally oscillatory and longitudinally movable tracer bar mounted coaxially therein, a valve member movable laterally relative to said body member by oscillatory movements of said tracer bar to open and close fluid supply and exhaust conduits of a hydraulic operating system for said die sinking machine, and a valve member movable axially relative to said body member by longitudinal movements of said bar to open and close other fluid supply and exhaust conduits of said hydraulic system.

3. A combination contouring and profiling tracer for hydraulically operated die sinking machines comprising in combination, a body member, a universally oscillatory and longitudinally movable tracer bar therein, a valve member movable laterally relative to said bar in any direction in a plane by oscillatory movements of said tracer bar to open and close fluid supply and exhaust conduits of a hydraulic operating system for said die sinking machine, and a valve member movable axially relative to said body member by longitudinal movements of said bar to open and close other fluid supply and exhaust conduits of said hydraulic system.

4. A combination contouring and profiling tracer for hydraulically operated die sinking machines comprising in combination, a body member, a universally oscillatory and longitudinally movable tracer bar therein, valve members movable relative to said body member to open and close fluid supply and exhaust conduits of a hydraulic system by oscillatory movements of said bar with said bar in any longitudinal position, and a valve member movable relative to said body member to open and close other fluid supply and exhaust conduits of the hydraulic system by longitudinal movements of said bar with said bar in any oscillated position.

5. A combination contouring and profiling tracer for hydraulically operated die sinking machines comprising in combination, a body member, a universally oscillatory and longitudinally movable tracer bar therein, valve members movable laterally within said body member to open and close fluid supply and exhaust conduits of a hydraulic system by oscillatory movements of said bar with said bar in any longitudinal position, and a valve member movable axially relative to said body member to open and close other fluid supply and exhaust conduits of the hydraulic system by longitudinal movements of said bar with said bar in any oscillated position.

6. A combination contouring and profiling tracer for hydraulically operated die sinking machines comprising in combination, a body member, a universally oscillatory and longitudinally movable tracer bar therein, valve members movable laterally in any direction in a plane within said body member to open and close fluid supply and exhaust conduits of a hydraulic system by oscillatory movements of said bar in any longitudinal position of said bar, and a valve member movable axially relative to said body member to open and close fluid supply and exhaust conduits of the hydraulic system by longitudinal movements of said bar in any oscillated position of said bar.

7. A combination contouring and profiling tracer for hydraulically operated die sinking machines comprising in combination, a body member, a universally oscillatory and longitudinally movable tracer bar therein, valve members movable within said body member to open and close fluid supply and exhaust conduits of a hydraulic operating system controlling movements of members of said die sinking machine at right angles to each other by oscillatory movements of said tracer bar, and a valve member movable relative to said body member to open and close fluid supply and exhaust conduits of said hydraulic system controlling movements of a member of said die sinking machine at right angles to the directions of movement of said above-mentioned members by longitudinal movement of said tracer bar.

8. A combination contouring and profiling tracer for hydraulically operated die sinking machines comprising in combination, a body member, a universally oscillatory and longitudinally movable tracer bar therein, valve members movable laterally in any direction in a plane within said body member to open and close fluid supply and exhaust conduits of a hydraulic operating system controlling movements of members of said die sinking machine at right angles to each other by oscillatory movements of said tracer bar, and a valve member movable axially relative to said body member to open and close fluid supply and exhaust conduits of said hydraulic system controlling movements of a member of said die sinking machine at right angles to the directions of movement of said above-mentioned members by longitudinal movement of said tracer bar.

9. A combination contouring and profiling tracer for hydraulically operated die sinking machines comprising in combination, a body member, a universally oscillatory and longitudinally movable tracer bar therein, valve members laterally movable within said body member to open and close fluid supply and exhaust conduits of a hydraulic operating system controlling movements of members of said die sinking machine at right angles to each other by oscillatory movements of said tracer bar, and a valve member movable axially relative to said body member to open and close fluid supply and exhaust conduits of said hydraulic system controlling movements of a member of said die sinking machine at right angles to the directions of movement of said above-mentioned members by longitudinal movement of said tracer bar, said valve members being movable laterally with the tracer rod in any axial position, and said valve member being movable axially with the tracer rod in any oscillated position.

ROBERT D. SHAW.